(12) United States Patent
Li

(10) Patent No.: US 8,290,079 B2
(45) Date of Patent: Oct. 16, 2012

(54) METHOD AND APPARATUS FOR PRECODING VALIDATION IN WIRELESS COMMUNICATIONS

(75) Inventor: Yingxue Li, Exton, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 1125 days.

(21) Appl. No.: 12/106,068

(22) Filed: Apr. 18, 2008

(65) Prior Publication Data

US 2008/0260058 A1  Oct. 23, 2008

Related U.S. Application Data

(60) Provisional application No. 60/912,746, filed on Apr. 19, 2007, provisional application No. 60/914,818, filed on Apr. 30, 2007.

(51) Int. Cl.
*H04B 7/02* (2006.01)
*H04L 1/02* (2006.01)

(52) U.S. Cl. ........................................ 375/267; 375/260

(58) Field of Classification Search .................. 375/260, 375/267
See application file for complete search history.

(56) References Cited

U.S. PATENT DOCUMENTS

| 7,583,747 | B1 * | 9/2009 | Damen et al. ................. 375/267 |
| 2006/0028976 | A1 * | 2/2006 | Park et al. ...................... 370/203 |
| 2006/0268623 | A1 * | 11/2006 | Chae et al. ............... 365/189.01 |
| 2007/0104283 | A1 * | 5/2007 | Han et al. ........................ 375/260 |
| 2008/0063110 | A1 * | 3/2008 | Averbuch et al. ............. 375/295 |
| 2008/0225960 | A1 * | 9/2008 | Kotecha et al. ............... 375/259 |
| 2008/0232494 | A1 * | 9/2008 | Pan et al. ....................... 375/260 |
| 2009/0219838 | A1 * | 9/2009 | Jia et al. ......................... 370/278 |
| 2010/0061477 | A1 * | 3/2010 | Lee et al. ....................... 375/267 |

OTHER PUBLICATIONS

Motorola, "Proposal for Dedicated Pilots in Downlink Precoding for EUTRA MIMO," 3GPP TSg RAN WG1 Meeting #48, R1-070770 (Feb. 12-16, 2007).
Love et al., "Limited Feedback Unitary Precoding for Spatial Multiplexing Systems," IEEE Transactions on Information Theory, vol. 51, No. 8, pp. 2967-2976 (Aug. 2005).
Choi et al., "Interpolation Based Transmit Beamforming for MIMO-OFDM with Limited Feedback," IEEE Transactions on Signal Processing, vol. 53, No. 11, pp. 4125-4135 (Nov. 2005).

* cited by examiner

*Primary Examiner* — Shuwang Liu
*Assistant Examiner* — Sung Ahn
(74) *Attorney, Agent, or Firm* — Condo Roccia LLP

(57) ABSTRACT

A method and apparatus for precoding validation in wireless communications with reduced error probability is disclosed. Error probability is reduced by applying phase rotations to precoding matrices, dedicated pilot symbols, or both to maximize a minimum pairwise distance.

11 Claims, 4 Drawing Sheets

METHOD AND APPARATUS FOR PRECODING VALIDATION IN WIRELESS COMMUNICATIONS

CROSS REFERENCE TO RELATED APPLICATIONS

This application claims the benefit of U.S. Provisional Applications 60/912,746, filed on Apr. 19, 2007, and 60/914,818, filed on Apr. 30, 2007, which are incorporated by reference as if fully set forth.

FIELD OF INVENTION

This application is related to wireless communications.

BACKGROUND

Multiple Input/Multiple Output (MIMO) is a technique used in wireless communications in which multiple transmitting and receiving antennas are used to improve communication quality. Transmission precoding is a technique to improve performance of MIMO systems, and reduce the complexity of MIMO receivers. Transmission precoding may require receiving feedback.

To reduce feedback overhead, a predetermined codebook may be used for precoding so that only an index to the codebook is needed for feedback. A transmitting unit uses a precoding matrix index (PMI) sent from a receiving unit to precode transmitted data. For data detection at the receiving unit, the same precoding matrix is required. If the transmitting unit and the receiving unit end up using different precoding matrices due to feedback error, the error rate for data detection will rise.

To avoid a precoding mismatch between the transmitting and receiving units, the transmitting unit often precodes known symbols in the same manner as data and transmits the precoded symbols. Such known symbols are referred to as dedicated pilot symbols. These symbols may then be used by a receiving unit to estimate the actual precoding matrix used in the data packet that has been received. This process is known as precoding validation.

SUMMARY

A method and apparatus for precoding validation in wireless communications with reduced error probability is disclosed. Error probability is reduced by applying phase rotations to precoding matrices, dedicated pilot symbols, or both.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
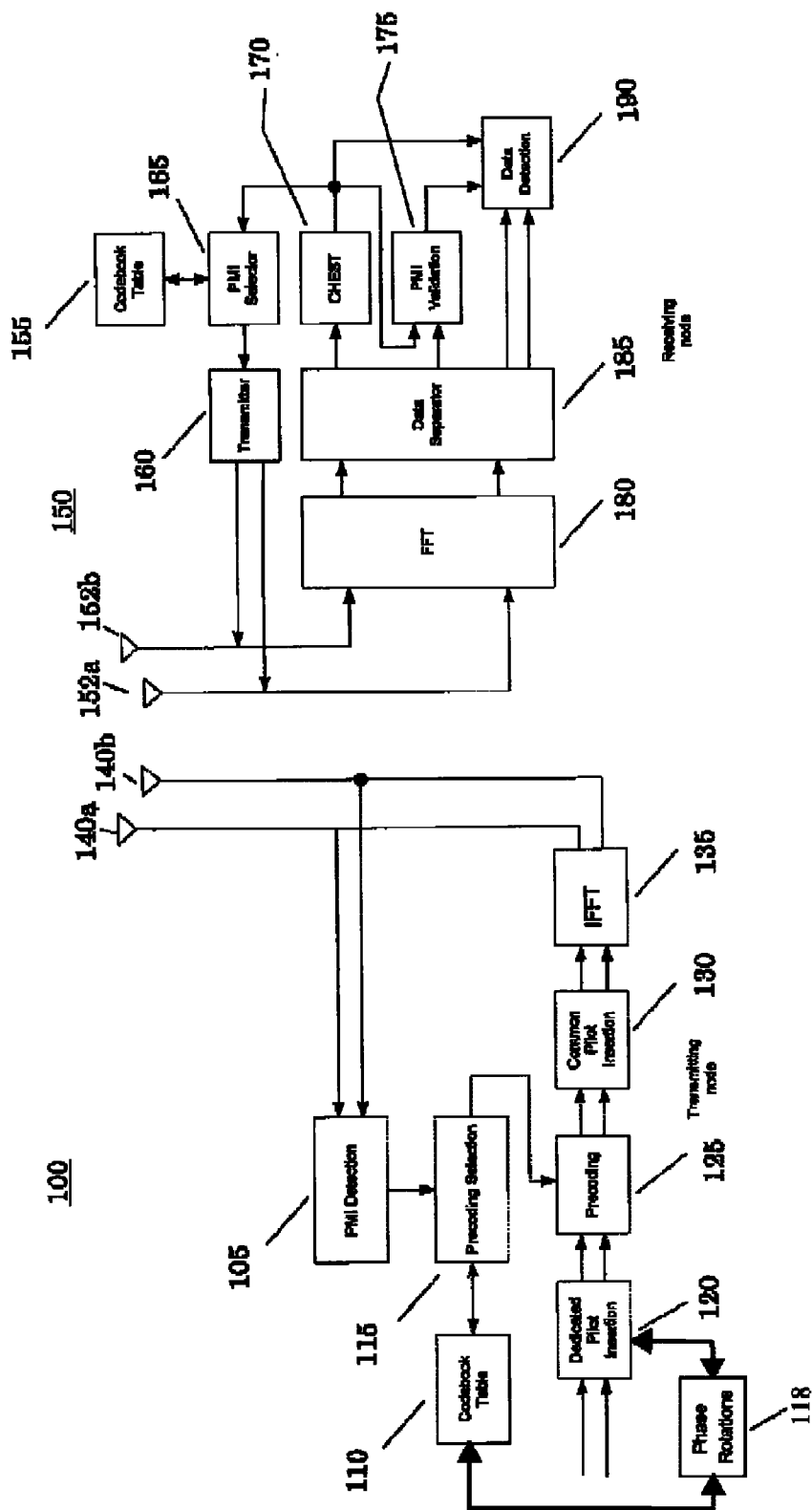
FIG. 1 is a block diagram of first apparatus embodiment.

FIG. 1 is a block diagram of a wireless communication system configured in accordance with a first embodiment. The system includes two units; a transmitting unit 100 and a receiving unit 150. The transmitting unit 100, which may be, for example, a Node-B or base station, includes more than one antenna 140a, 140b. The receiving unit 150, which may be, for example, a WTRU, includes one or more antennas 152a, 152b. The terms "transmitting unit" and "receiving unit" are used here for purposes of explanation and identification and should not be construed as limiting. Both units 100 and 150 include both transmitting and receiving functionality.

The transmitting unit 100 may be configured to receive a signal that contains information regarding a precoding matrix index (PMI) that is transmitted by receiving unit 150. The received signal is fed to PMI detection circuit 105, where the PMI signal is extracted and detected. The detected PMI is then fed to precoding selection circuit 115, which is coupled to codebook table 110. Codebook table 110 includes a number of precoding matrices, each associated with a unique index. Precoding selection circuit 115 selects a precoding matrix with an index matching the detected PMI, and sends the precoding matrix to precoding circuit 125. Precoding circuit 125 also receives data and a dedicated pilot symbol as input, and precodes the mixed data/pilot signal with the precoding matrix. The dedicated pilot symbol is added to data in dedicated pilot insertion circuit 120.

As will be explained in detail hereinafter, a phase rotation may be applied to dedicated pilot symbols before they are added to the data in order to decrease the probability of error during PMI validation. Common pilot insertion circuit 130 inserts common pilot symbols into the precoded signal and the signal is transmitted over the air. The signal may be transmitted after it is transformed by Inverse Fast Fourier Transform (IFFT) circuit 135.

The receiving unit 150 may be configured to separate the received signal after processing by Fast Fourier transform (FFT) circuit 180. Data separator circuit 185 is provided to separate the received signal into three branches: common pilot, dedicated pilot and data. The common pilot signals are sent to channel estimation circuit 170, where the wireless channel response is estimated. The estimated channel is sent to PMI selector circuit 165, PMI validation circuit 175, and data detection circuit 190, which receives the data branch of the received signal from data separator circuit 185.

In PMI selector circuit 165, an optimum precoding matrix is selected from codebook table 155 according to channel conditions. The selected precoding matrix is represented by a PMI, which is transmitted, via transmitter 160 of receiving unit 150, back to transmitting unit 100 for the next data transmission.

The estimated channel is also sent to PMI validation circuit 175, where the dedicated pilot signal is used to identify the precoding matrix that was actually used to precode the data. While the ideal precoding matrix should be identical to the matrix that was sent back to transmitting unit 100, in reality, these two signals may differ due to feedback error.

The data part of the signal is sent to data detection circuit 190, which also takes the channel estimate and the identified precoding matrix as input. The channel estimate and the identified precoding matrix are combined to produce the effective channel. To ensure data detection functions properly, it is desirable that the identified precoding matrix at receiving unit 150 is identical to the precoding matrix selected by transmitting unit 100; otherwise, the performance of the system may be degraded.

Figure 2:
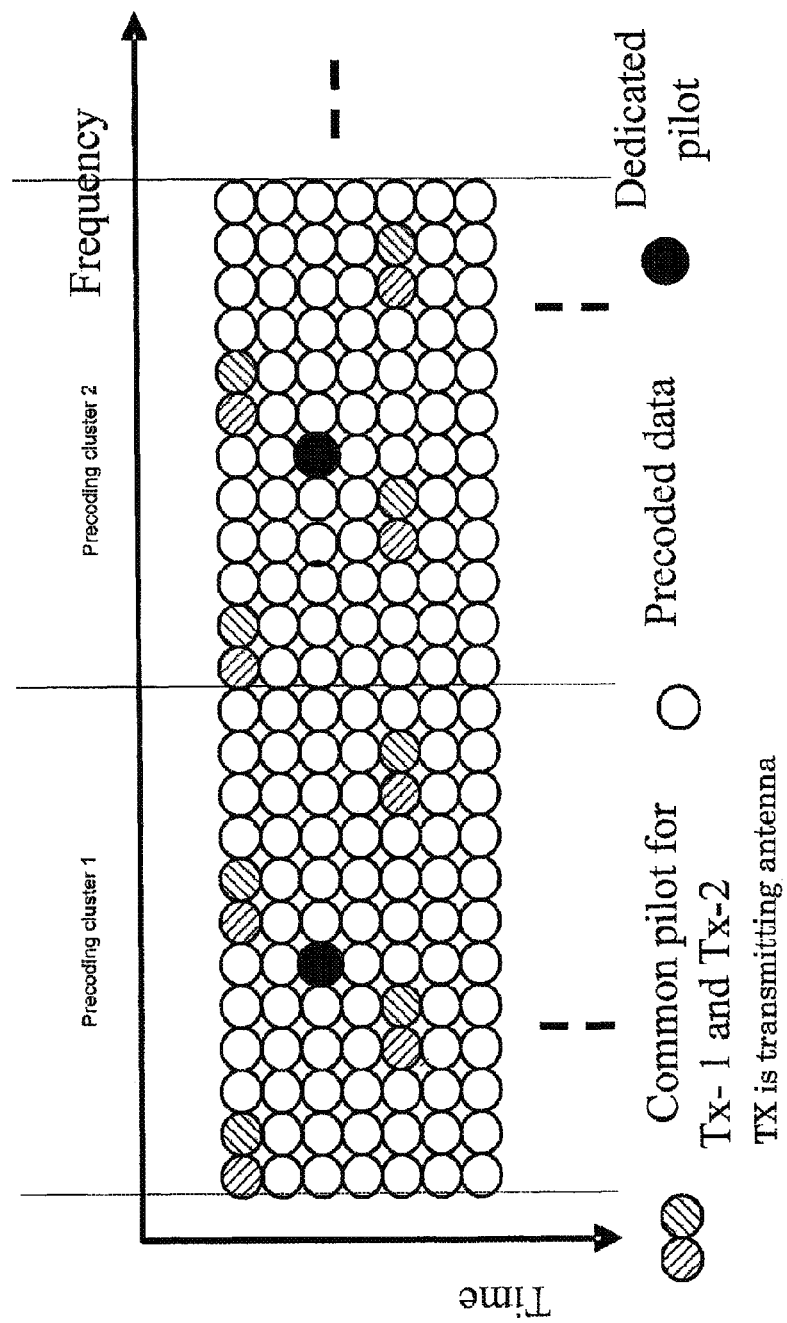
FIG. 2 shows a signal arrangement in the frequency and time planes for an Orthogonal Frequency Division Multiplexed (OFDM) MIMO system in accordance with one embodiment.

PMI validation accuracy may be improved by modifying a codebook and using dedicated pilot symbols such that a probability of an incorrect identification of the precoding matrix is decreased. For example, PMI validation for an OFDM-MIMO system may include a signal arrangement in the frequency and time planes as shown in FIG. 2 for a system with two transmit antennas and two precoding clusters. A precoding cluster is a collection of frequency subcarriers that share the same precoding matrix. In this example, for each precoding cluster, there is a dedicated pilot tone. More than one dedicated pilot tone is used when there is more than one precoding cluster.

The validation process will now be described. Channel response is estimated using a common pilot channel. Assume a channel response matrix H, with a dedicated pilot tone, is known to the PMI validation process as follows:

$$H = \begin{pmatrix} h_{11} & h_{12} & \cdots & h_{1M} \\ h_{21} & & & \\ \vdots & & \ddots & \\ h_{2N} & & & h_{NM} \end{pmatrix};$$

Equation 1 where $h_{nm}$ represents a channel response from an m_th transmit antenna to an n_th receive antenna. A set of dedicated pilot symbols of the precoding cluster may be represented as a vector with each pilot symbol as an element of the vector, such as:

$$p = \begin{pmatrix} p_1 \\ p_2 \\ \vdots \\ p_k \\ \vdots \\ p_K \end{pmatrix};$$

Equation 2 where $p_k$ is the pilot symbol on the k_th data stream. The received signal corresponding to this dedicated pilot symbol vector may be represented as another vector:

$$Y = \begin{pmatrix} y_1 \\ y_2 \\ \vdots \\ y_n \\ \vdots \\ y_N \end{pmatrix};$$

Equation 3 where $y_n$ is the received signal at the n_th receiving antenna.

Assume there are a total of L candidate precoding matrices $V^{(l)}, l=1, 2, \ldots L$ in the codebook. The PMI validation process examines each hypothetical precoding matrix $V^{(l)}$, and selects one, $\hat{V}$, that results in a minimum norm distance to the received signals, represented as:

$$\hat{V} = \arg\min_{V^{(l)}} \|Y - HV^{(l)}P\|^2.$$

Equation 4

The probability of error in the validation process can be reduced by carefully choosing precoding matrices, dedicated pilot symbols, or both. The following is a description of a method for making these choices.

One factor influencing the PMI validation error rate is a minimum pair-wise distance (MPD) between two distinct precoding matrices $V^{(l)}$ and $V^{(l')}$, defined as follows:

$$D = \min_{<l,l'>} (\|V^{(l)}P - V^{(l')}P\|^2).$$

Equation 5

To reduce PMI validation error, the codebook may be modified by multiplying each of the precoding matrices by a phase rotation (e.g. in 118), represented by:

$$V_{mod}^{(l)} = e^{j\theta^{(l)}} V^{(l)}.$$

Equation 6

The dedicated pilot symbol may also be modified using a separate set of phase rotations (e.g. in 118), symbolized by:

$$P_{mod} = \begin{pmatrix} \exp(j\varphi_1) \\ \exp(j\varphi_2) \\ \vdots \\ \exp(j\varphi_K) \end{pmatrix}.$$

Equation 7

Such phase rotated dedicated pilot symbols (e.g. new dedicated pilot symbols) may be provided to precoding circuitry 125 of transmitting unit 100 by dedicated pilot insertion circuitry 120 in FIG. 1.

After modification of the precoding matrices and dedicated pilot symbols, the modified minimum pair-wise distance becomes:

$$D_{mod} = \min_{<l,l'>} (\|V_{mod}^{(l)} P_{mod} - V_{mod}^{l'} P_{mod}\|^2).$$

Equation 8

The phase rotations of the precoding matrices alone, the dedicated pilot symbols alone, or both may be chosen such that the modified minimum pair-wise distance $D_{mod}$ is maximized. In that situation, the probability of selecting an incorrect precoding matrix is using equation (4) is minimized. This may be viewed as a result of the quantities $V_{mod}^{(l)} P_{mod}$ being spread as far apart as possible in a signal space.

If the MPD is maximized by more than one set of phase shifts, the set selected may be one that results in the smallest number of pairs having that maximum MPD. This can be done by exhaustively searching all possible combinations of $\{\theta_l\}$ and $\{\phi_k\}$.

This method may be applied to any type of codebook as shown in the following examples.

In a first example, an original codebook for a long term evolution (LTE) wireless system for two transmit antennas, operating in rank-1 mode, is assumed to be:

$$\begin{pmatrix}1\\0\end{pmatrix}, \begin{pmatrix}0\\1\end{pmatrix}, \frac{1}{\sqrt{2}}\begin{pmatrix}1\\1\end{pmatrix}, \frac{1}{\sqrt{2}}\begin{pmatrix}1\\-1\end{pmatrix},$$
$$\frac{1}{\sqrt{2}}\begin{pmatrix}1\\j\end{pmatrix}, \frac{1}{\sqrt{2}}\begin{pmatrix}1\\-j\end{pmatrix}.$$
Equation 9

The codebook may be modified to be:

$$\begin{pmatrix}-j\\0\end{pmatrix}, \begin{pmatrix}0\\1\end{pmatrix}, \frac{1}{\sqrt{2}}\begin{pmatrix}-1\\-1\end{pmatrix},$$
$$\frac{1}{\sqrt{2}}\begin{pmatrix}j\\-j\end{pmatrix}, \frac{1}{\sqrt{2}}\begin{pmatrix}1\\j\end{pmatrix}, \frac{1}{\sqrt{2}}\begin{pmatrix}1\\-j\end{pmatrix}.$$
Equation 10

Equation (10) is obtained by multiplying matrices of the original codebook in Equation (9) by a phase shifter, represented as:

$$[-j, 1, -1, j, 1, 1].$$
Equation 11

The first precoding matrix in Equation (10), is multiplied by (−j), the second precoding matrix shown in Equation (10) is multiplied by 1, and so on. If a common phase shift is applied to all precoding matrices represented by Equation (10), the system will operate with unchanged performance.

Since this is rank-1 operation, meaning only one data stream is sent, the dedicated pilot symbol vector can be set to $P_{mod}=(1)$.

Figure 3:
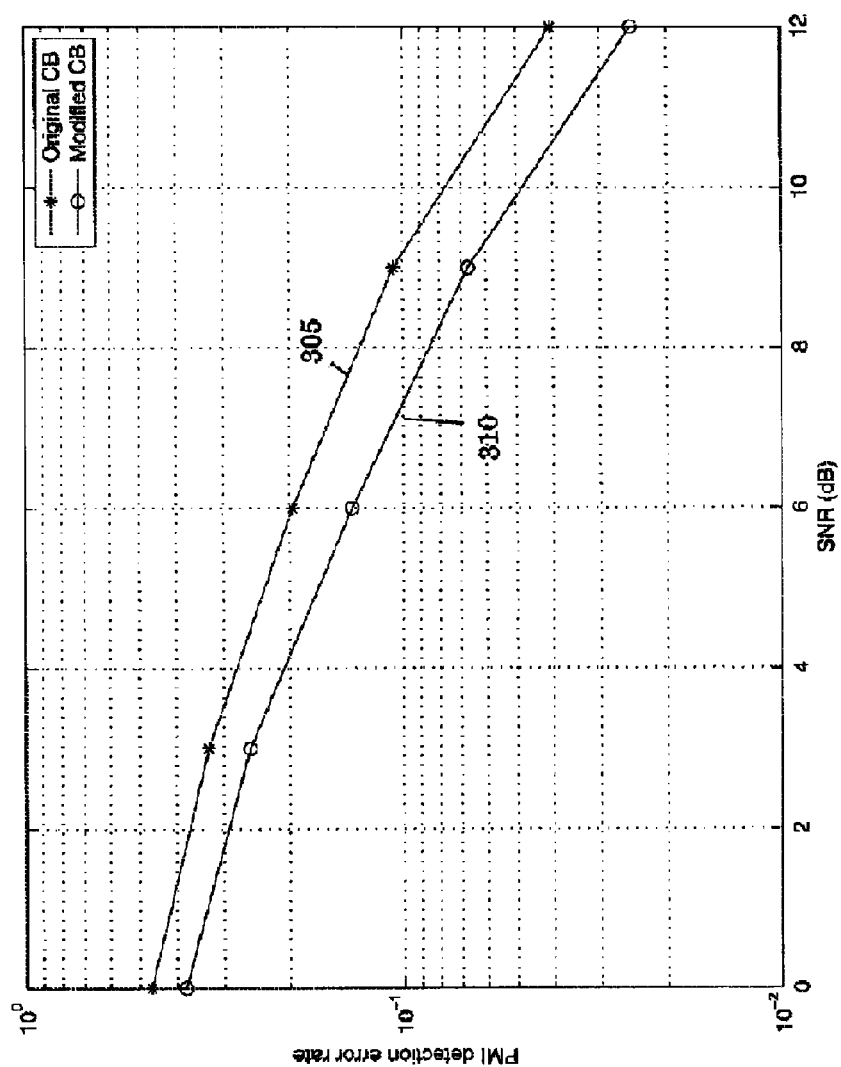
FIG. 3 is a graph showing results of implementing one embodiment.

FIG. 3 is an example of a simulated performance comparison. The figure is a graph of a PMI error rate versus a signal-to-noise ratio (SNR). Upper curve 305 was obtained using the original codebook defined by Equation (9), while lower curve 310 was obtained using the modified codebook as defined by Equation (10). It can be seen that modification that improves PMI validation performance by more than 1.5 dB.

The MPD of the codebook represented by Equation (9) can be shown to be approximately 0.56 and the number of matrix pairs having this MPD is five. By comparison, the MPD of the codebook represented by Equation (10) is 1.0, and the number of MPD matrix pairs having that MPD is one. Therefore the codebook defined in Equation (10) will result in better PMI validation accuracy than that defined in Equation (9).

In a second example, assume a long term evolution (LTE) wireless system for 4 transmit antennas is operating in rank-3 mode. Assume an original codebook for this system to be:

$$V^{(1)} = \begin{pmatrix} 0.5 & 0.5 & 0.5 \\ 0.5 & 0.5 & -0.5 \\ 0.5 & -0.5 & 0.5 \\ 0.5 & -0.5 & -0.5 \end{pmatrix},$$
Equation 12

$$V^{(2)} = \begin{pmatrix} 0.5 & 0.5 & 0.5j \\ 0.5 & 0.5 & -0.5j \\ 0.5j & -0.5j & 0.5 \\ 0.5j & -0.5j & -0.5 \end{pmatrix},$$

$$V^{(3)} = \begin{pmatrix} 0.5 & 0.5 & 0.5j \\ 0.5 & 0.5 & -0.5j \\ -0.5j & 0.5j & 0.5 \\ -0.5j & 0.5j & -0.5 \end{pmatrix},$$

-continued $$V^{(4)} = \begin{pmatrix} 0.5 & 0.5j & 0.5j \\ -0.5j & 0.5 & -0.5 \\ -0.5j & -0.5 & 0.5 \\ -0.5j & -0.5 & -0.5 \end{pmatrix},$$

$$V^{(5)} = \begin{pmatrix} 0.5 & -0.5j & -0.5j \\ 0.5j & 0.5 & -0.5 \\ 0.5j & -0.5 & 0.5 \\ 0.5j & -0.5 & -0.5 \end{pmatrix},$$

$$V^{(6)} = \begin{pmatrix} 0.5 & 0.5 & 0.5 \\ 0.5 & 0.5 & -0.5 \\ 0.5 & -0.5 & 0.5 \\ 0.5j & -0.5j & -0.5j \end{pmatrix},$$

$$V^{(7)} = \begin{pmatrix} 0.5 & 0.5 & 0.5 \\ 0.5 & 0.5 & -0.5 \\ 0.5 & -0.5 & 0.5 \\ -0.5j & 0.5j & 0.5j \end{pmatrix},$$

$$V^{(8)} = \begin{pmatrix} 0.5 & 0.5 & -0.5 \\ 0.5 & 0.5 & 0.5 \\ -0.5 & 0.5 & 0.5 \\ -0.5 & 0.5 & -0.5 \end{pmatrix},$$

$$V^{(9)} = \begin{pmatrix} 0.5 & -0.5 & -0.5 \\ -0.5 & 0.5 & -0.5 \\ -0.5 & -0.5 & 0.5 \\ -0.5 & -0.5 & -0.5 \end{pmatrix},$$

$$V^{(10)} = \begin{pmatrix} 0.5 & 0.5 & 0.5 \\ 0.5 & 0.5 & -0.5 \\ 0.5 & -0.5 & 0.5 \\ -0.5 & 0.5 & 0.5 \end{pmatrix},$$

$$V^{(11)} = \begin{pmatrix} 0.5 & 0.5 & 0.5 \\ 0.5 & 0.5 & -0.5 \\ 0.5j & -0.5j & 0.5 \\ 0.5 & -0.5 & -0.5j \end{pmatrix},$$

$$V^{(12)} = \begin{pmatrix} 0.5 & 0.5j & 0.5j \\ -0.5j & 0.5 & -0.5 \\ -0.5j & -0.5 & 0.5 \\ -0.5 & 0.5j & 0.5j \end{pmatrix},$$

$$V^{(13)} = \begin{pmatrix} -1 & 0 & 0 \\ 0 & 1 & 0 \\ 0 & 0 & 1 \\ 0 & 0 & 0 \end{pmatrix}, V^{(14)} = \begin{pmatrix} 0 & 0 & 0 \\ 1 & 0 & 0 \\ 0 & 1 & 0 \\ 0 & 0 & 1 \end{pmatrix},$$

$$V^{(15)} = \begin{pmatrix} -1 & 0 & 0 \\ 0 & 0 & 0 \\ 0 & 1 & 0 \\ 0 & 0 & 1 \end{pmatrix}, V^{(16)} = \begin{pmatrix} -1 & 0 & 0 \\ 0 & 1 & 0 \\ 0 & 0 & 0 \\ 0 & 0 & 1 \end{pmatrix}.$$

Assume also that the dedicated pilot pattern is defined by:

$$P = \begin{pmatrix} 1 \\ 1 \\ 1 \end{pmatrix}.$$

Equation 13

The codebook can be modified by multiplying a phase shift represented as:

$$[-1,-j,-j,-j,j,j,1,-1,-j,j,1,1,-1,-j,j].$$

Equation 14

This creates the following new codebook:

$$V^{(1)} = \begin{pmatrix} -0.5 & -0.5 & -0.5 \\ -0.5 & -0.5 & 0.5 \\ -0.5 & 0.5 & -0.5 \\ -0.5 & 0.5 & 0.5 \end{pmatrix},$$

Equation 15

$$V^{(2)} = \begin{pmatrix} -0.5j & -0.5j & 0.5 \\ -0.5j & -0.5j & -0.5 \\ 0.5 & -0.5 & -0.5j \\ 0.5 & -0.5 & 0.5j \end{pmatrix},$$

$$V^{(3)} = \begin{pmatrix} -0.5j & -0.5j & 0.5 \\ -0.5j & -0.5j & -0.5 \\ -0.5 & 0.5 & -0.5j \\ -0.5 & 0.5 & 0.5j \end{pmatrix},$$

$$V^{(4)} = \begin{pmatrix} 0.5j & 0.5 & 0.5 \\ -0.5 & -0.5j & 0.5j \\ -0.5 & 0.5j & -0.5j \\ -0.5 & 0.5j & 0.5j \end{pmatrix},$$

$$V^{(5)} = \begin{pmatrix} 0.5j & 0.5 & 0.5 \\ -0.5 & 0.5j & -0.5j \\ -0.5 & -0.5j & 0.5j \\ -0.5 & -0.5j & -0.5j \end{pmatrix},$$

$$V^{(6)} = \begin{pmatrix} 0.5j & 0.5j & 0.5j \\ 0.5j & 0.5j & -0.5j \\ 0.5j & -0.5j & 0.5j \\ -0.5 & 0.5 & 0.5 \end{pmatrix},$$

$$V^{(7)} = \begin{pmatrix} 0.5 & 0.5 & 0.5 \\ 0.5 & 0.5 & -0.5 \\ 0.5 & -0.5 & 0.5 \\ -0.5j & 0.5j & 0.5j \end{pmatrix},$$

$$V^{(8)} = \begin{pmatrix} 0.5 & 0.5 & -0.5 \\ 0.5 & 0.5 & 0.5 \\ -0.5 & 0.5 & 0.5 \\ -0.5 & 0.5 & -0.5 \end{pmatrix},$$

$$V^{(9)} = \begin{pmatrix} 0.5 & -0.5 & -0.5 \\ -0.5 & 0.5 & -0.5 \\ -0.5 & -0.5 & 0.5 \\ -0.5 & -0.5 & -0.5 \end{pmatrix},$$

$$V^{(10)} = \begin{pmatrix} -0.5 & -0.5 & -0.5 \\ -0.5 & -0.5 & 0.5 \\ -0.5 & 0.5 & -0.5 \\ 0.5 & -0.5 & -0.5 \end{pmatrix},$$

$$V^{(11)} = \begin{pmatrix} -0.5j & -0.5j & -0.5j \\ -0.5j & -0.5j & 0.5j \\ 0.5 & -0.5 & -0.5j \\ -0.5j & 0.5j & -0.5 \end{pmatrix},$$

$$V^{(12)} = \begin{pmatrix} 0.5 & 0.5j & 0.5j \\ -0.5j & 0.5 & -0.5 \\ -0.5j & -0.5 & 0.5 \\ -0.5 & 0.5j & 0.5j \end{pmatrix},$$

$$V^{(13)} = \begin{pmatrix} -1 & 0 & 0 \\ 0 & 1 & 0 \\ 0 & 0 & 1 \\ 0 & 0 & 0 \end{pmatrix}, V^{(14)} = \begin{pmatrix} 0 & 0 & 0 \\ -1 & 0 & 0 \\ 0 & -1 & 0 \\ 0 & 0 & -1 \end{pmatrix},$$

$$V^{(15)} = \begin{pmatrix} j & 0 & 0 \\ 0 & 0 & 0 \\ 0 & -j & 0 \\ 0 & 0 & -j1 \end{pmatrix}, V^{(16)} = \begin{pmatrix} -j & 0 & 0 \\ 0 & j & 0 \\ 0 & 0 & 0 \\ 0 & 0 & j \end{pmatrix}.$$

The MPD of the codebook represented by Equation (12) can be calculated to be approximately 0.5, and the number of MPD matrix pairs having that MPD is five. By contrast, the MPD of the codebook represented by Equation (15) is equal to 2 and the number of MPD matrix pairs having that MPD is 4. Therefore, the codebook defined in Equation (15) will result in better PMI validation accuracy.

PMI validation accuracy can be further improved by using a dedicated pilot pattern shown by:

$$P = \begin{pmatrix} 1 \\ \exp\left(j\frac{2\pi}{3}\right) \\ \exp\left(j\frac{4\pi}{3}\right) \end{pmatrix};$$

Equation 16 and a corresponding phase shift shown by:

$$[-j,-j,-j,j,j,1,1,1,1,j,-j,-1,1,-j,j,-1].$$

Equation 17

The combination of the dedicated pilot pattern and the phase shifting increases the MPD of the codebook represented to 3, and reduces the number of MPD matrix pairs having that MPD to 2, which provides better PMI validation accuracy. The phase shifting applied to precoding matrices can be absorbed in the precoding matrices, effectively creating a new codebook, as described above description of FIG. 1.

Figure 4:
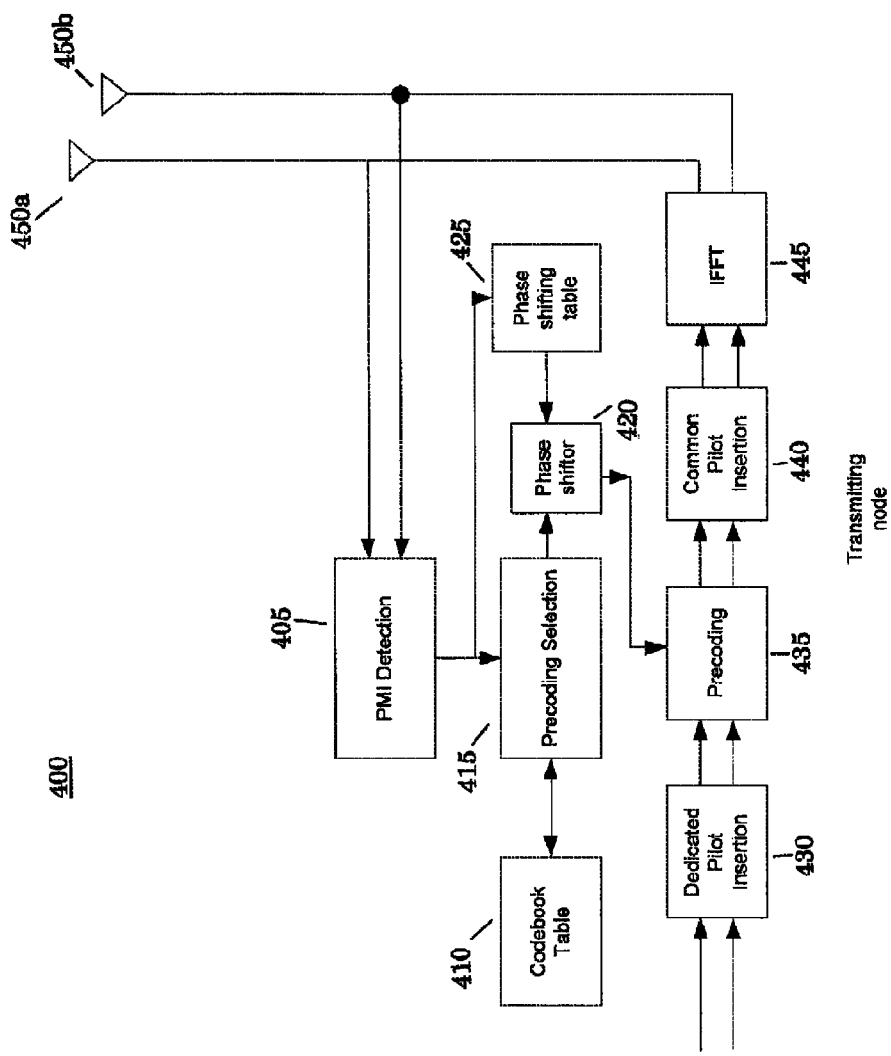
FIG. 4 is a block diagram of a second apparatus embodiment.

FIG. 4 is a block diagram of an alternative embodiment of a transmitter unit 400, which includes external phase shifter 420 and external phase shifting table 425, in addition to features corresponding to those of FIG. 1. The transmitter unit 400 is configured to work with a receiving unit such as the receiving unit 150 in FIG. 1. A precoding matrix is selected by precoding selection circuit 415 from codebook table 410, and a phase shift is selected from phase shifting table 425. Both the precoding matrix and the appropriate phase shift may be selected according to PMI feedback sent from a receiving circuit such as the receiving unit 150 in FIG. 1 and detected by PMI detection circuit 405. The selected precoding matrix is then phase shifted by the selected amount in phase shifter 420 to obtain a new precoding matrix. The new precoding matrix is then conveyed to precoding circuit 435. Precoding circuit 435 also receives data and a dedicated pilot symbol as input, and precodes the mixed data/pilot signal with the precoding matrix. This dedicated pilot symbol is added to data in a dedicated pilot insertion circuit 430. The precoded signal is conveyed to a common pilot insertion circuit 440 where common pilot symbols are inserted. The signal is transformed by Inverse Fast Fourier Transform (IFFT) circuit 445 and is then transmitted by a plurality of antennas 450a and 450b.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for validation of precoding in multiple-input/multiple output (MIMO) wireless communications, comprising:
    defining a codebook comprising a plurality of original precoding matrices;
    defining an original dedicated pilot symbol;
    applying at least one phase rotation from a plurality of phase rotations to at least one of
        an original precoding matrix and
        the original dedicated pilot symbol;
    to produce, respectively, a modified precoding matrix and a modified dedicated pilot symbol, wherein the at least one phase rotation is configured to maximize a minimum pairwise distance amongst pairwise distances calculated for each of the phase rotations based on the original precoding matrices and the original dedicated pilot symbol.

2. The method of claim 1, further comprising:
    transmitting a signal corresponding to one of:
        the original dedicated pilot symbol precoded using the modified precoding matrix;
        the modified dedicated pilot symbol precoded using the modified precoding matrix; and
        the modified dedicated pilot symbol precoded using one of the original precoding matrices.

3. The method of claim 1, further comprising:
    receiving the transmitted signal;
    for each precoding matrix:
        calculating an expected received signal using the set of dedicated pilot symbols; and
        calculating a distance between the expected received signal and the received signal; and
        choosing a precoding matrix having the minimum calculated distance as the precoding matrix to be used in decoding the received signal.

4. The method of claim 1, comprising:
    for all possible sets of the plurality of phase rotations:
        calculating the pairwise distance for all possible pairs of quantities $V^{(i)}p$ and $V^{(i')}p$, where $V^{(i)}$ and $V^{(i')}$ represent two distinct precoding matrices and p represents a dedicated pilot symbol; and
        determining the minimum of the pairwise distances (MPD);
    selecting at least one set of the phase rotations which maximize the MPD; and
    using the selected set of the phase rotations in the validation of precoding.

5. The method of claim 4, comprising:
    if more than one set of the phase rotations maximize the MPD, selecting one of the maximizing sets which results in the smallest number of pairs having the maximum MPD; and
    using the selected maximizing set for the precoding validation.

6. The method of claim 1, comprising:
    receiving precoding matrix index feedback;
    selecting precoding matrices based on the feedback;
    selecting the at least one phase rotation based on the feedback;
    applying the selected phase rotation to the selected precoding matrix, resulting in a new precoding matrix; and
    using the new precoding matrix to precode one of: an original dedicated pilot symbol and a modified precoded symbol.

7. A wireless transmit/receive unit (WTRU) configured for validation of precoding in multiple-input/multiple output (MIMO) wireless communications, comprising:
    a precoding matrix index (PMI) detection circuit configured for receiving a PMI;
    a codebook table configured for storing a plurality of precoding matrices;
    a precoding selection circuit coupled to the PMI detection circuit and codebook table, configured to select a precoding matrix in the codebook table based on a PMI received by the PMI detection circuit;
    a dedicated pilot insertion circuit configured to add dedicated pilot symbols to data;
    a common pilot insertion circuit configured for inserting common pilot symbols into the precoded signal;
    a phase shift table configured for:
        storing first sets of phase rotations, wherein the first sets of phase rotations are configured to maximize a minimum pairwise distance amongst pairwise distances calculated for each possible phase rotation based on the precoding matrices and at least one of the dedicated pilot symbols;

receiving a PMI from the PMI detection circuit; and selecting a stored first set of phase rotations based on the PMI; a phase shifting circuit configured for:

receiving the selected first set of phase rotations from the phase shifting table;

receiving the selected precoding matrix from the precoding selection circuit;

applying the selected first set of phase rotations to the selected precoding matrix to make a new precoding matrix;

a precoding circuit configured to receive the new precoding matrix from the phase shifting circuit; receive the dedicated pilot symbols and data from the dedicated pilot insertion circuit and apply the selected matrix to the dedicated pilot symbols and data to form a precoded signal; and a plurality of antennas configured for transmitting the precoded signal and receiving the PMI.

8. The WTRU of claim 7, further comprising an Inverse Fast Fourier Transform (IFFT) circuit configured for applying an IFFT to the precoded signal before the signal is transmitted.

9. The WTRU of claim 7, wherein the dedicated pilot insertion circuit is further configured for:

applying the second sets of phase rotations to the dedicated pilot symbols to make new dedicated pilot symbols; and providing the new dedicated pilot symbols to the precoding circuit.

10. The WTRU of claim 7, wherein the first sets of phase rotations are further selected to reduce validation errors by maximizing the minimum pairwise distance between all possible pairs of quantities $V^{(I)}p$ and $V^{(I')}p$, where $V^{(I)}$ and $V^{(I')}$ represent two distinct precoding matrices and p represents a dedicated pilot symbol.

11. The WTRU of claim 9, wherein the first and second sets of phase rotations are further selected for reducing validation errors by maximizing the minimum pairwise distance between all possible pairs of quantities and $V^{(I)}p'$ and $V^{(I)}p'$, where $V^{(I)}$ and $V^{(I')}$ represent two distinct precoding matrices and p and p' represent a new dedicated pilot symbol.

\* \* \* \* \*